UNITED STATES PATENT OFFICE.

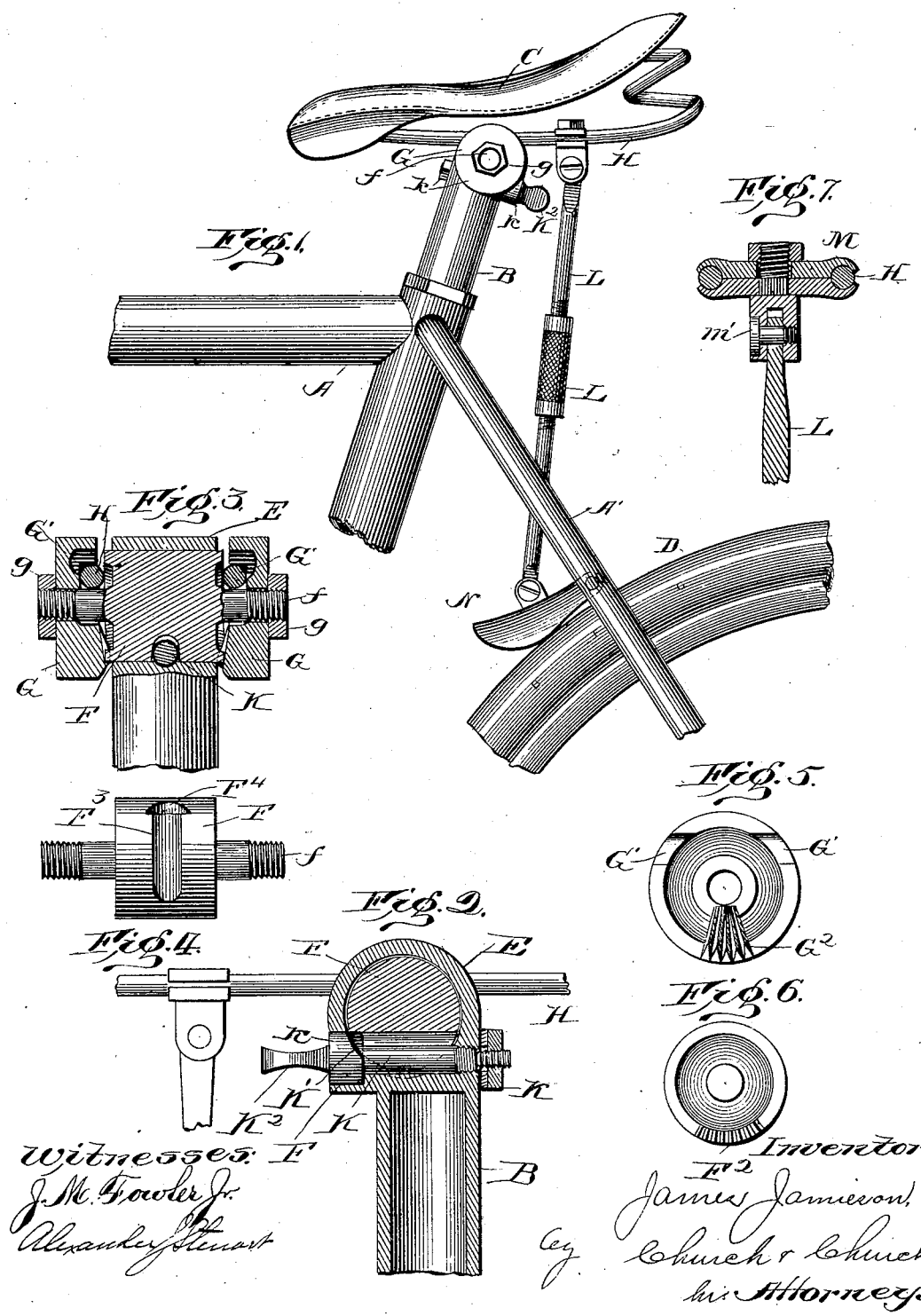

JAMES JAMIESON, OF HAMILTON, CANADA.

BICYCLE-BRAKE.

SPECIFICATION forming part of Letters Patent No. 633,266, dated September 19, 1899.

Application filed September 13, 1898. Serial No. 690,879. (No model.)

*To all whom it may concern:*

Be it known that I, JAMES JAMIESON, a subject of the Queen of Great Britain, residing at Hamilton, in the Province of Ontario, Canada, have invented certain new and useful Improvements in Bicycle-Brakes; and I do hereby declare the following to be a full, clear, and exact description of the same, reference being had to the accompanying drawings, forming a part of this specification, and to the letters of reference marked thereon.

This invention relates to improvements in brakes, and particularly such as are applied to vehicles adapted to be propelled by the rider, the objects of the invention being to provide a brake which will be simple and neat in design and which is adapted to be operated by the movements of the rider's body on the seat or saddle upon which he is supported, a further object of the invention being to provide a brake of this character which may be locked against operation easily and conveniently, the vehicle and its seat or saddle being then held in their normal relative positions and the brake out of operation.

Referring to the accompanying drawings, Figure 1 is a detail side elevation of one portion of an ordinary diamond-frame bicycle, showing the seat-post, the saddle, and a section of the rim and tire of the rear wheel with my brake in position ready for use. Fig. 2 is a vertical section taken through the seat-post in a plane from front to rear, showing the relatively movable and stationary parts with the lock for holding the parts in fixed relation to each other. Fig. 3 is a detail section at right angles to Fig. 2. Fig. 4 is an elevation of the rocking pin or journal upon which the seat or saddle is directly supported. Fig. 5 is a detail elevation of one of the clamping-washers for securing the saddle to the rocking pin or journal; and Fig. 6 is a corresponding elevation looking at one end of the pin or journal itself, these two views, Figs. 5 and 6, illustrating the means for adjusting the normal inclination of the saddle to suit different riders. Fig. 7 is a detail vertical section of the upper end of the connection between the saddle and brake-rod.

Like letters of reference in the several figures indicate the same parts.

The portion of the frame of the bicycle illustrated is indicated by the letter A, and projecting therefrom and secured thereto in any usual or ordinary manner is the seat-post B, upon the upper end of which the seat or saddle C is adapted to be supported.

D indicates a section of the rim of the vehicle-wheel, and A' the rear braces of the frame.

The upper end of the seat-post in the present instance is preferably formed with a transverse circular opening constituting a bearing E, in which is journaled a preferably relatively large cylindrical pin or cylinder F. Projecting from this cylinder F are two threaded elongations $f$, adapted to carry locking-washers G, which washers G are in turn locked and held in place by nuts $g$ and are adapted to clamp between their inner faces and the ends of the cylinder F the side bars or frame H of the saddle C. Notches or recesses G' may be formed in the inner faces of the washers G and edge of the cylinder F, respectively, into which the side bars H of the saddle-frame may fit, and the washers G are held in their proper relative positions with respect to the cylinder F by means of the toothed portions $G^2$, which coöperate with correspondingly-toothed portions $F^2$ on the ends of the cylinder or pin F, as illustrated clearly in Figs. 5 and 6. This construction permits the washers G, together with the saddle, to be set at any desired inclination with respect to the cylinder or pin F, and the washers in addition prevent any lateral movement of the saddle. The cylinder or pin is prevented from rotating by means of a locking-pin K, journaled in the head of the seat-post and adapted to be held in position by a lock-nut $k$ on its forward end. This locking-pin K passes through a slot $F^3$ in the cylinder F, preventing undue longitudinal movement, and the top of this slot $F^3$, striking the pin, prevents the cylinder from rotating except for a short distance.

With a view now to locking the cylinder absolutely against rotation and so securing the saddle rigidly in place upon the seat-post against any rocking movement the locking-pin K is provided at its rear end with an enlargement K', one portion of which, $k'$, is cut away, as shown clearly in Fig. 2, and the other portion of which is adapted to turn into a recess F⁴, formed in the cylinder F. The pin K may be turned by a thumb or finger piece K², and when in the position illustrated in Fig. 2 it will permit the cylinder F and the seat carried thereby to have a limited rocking or rotary movement; but when turned at right angles to this position or given a half-turn the head K', passing into the recess F⁴, will prevent any movement of the cylinder F in the seat-post, as just explained.

To the rear portion of the frame H of the seat or saddle the brake-rod L is pivotally connected, preferably by means of a clamp M, formed in two parts to embrace the frame H and secured together by the bolt $m$ and nut, the lower portion of which is bifurcated for the reception of the upper end of the connecting-rod L, these parts being held together by the screw $m'$, forming a hinge connection. The lower end of the brake or connecting rod L is pivotally connected with a brake-shoe N, which brake-shoe is preferably pivotally supported between the rear braces A' of the frame of the machine. The brake-rod L may be made adjustable in any usual or preferred manner, or, as illustrated, by means of a central coupling L', into which the adjacent ends of the two parts of the brake-rods are screwed with right and left threads.

The brake-shoe preferably projects forwardly from the connection with the frame, so as to prevent any binding action, although this is optional, and, in fact, any usual form of brake-shoe or brake-rod connection therewith may be employed without in any wise modifying the other features of the invention.

In operation now the rider seated in the saddle may, if he so desires, lock the saddle against any rocking movement, or, on the other hand, if he desires to utilize the brake the locking-pin may be turned so as to allow the saddle a limited rocking movement. Then by leaning back or shifting his weight to the rear portion of the saddle he may depress the brake-rod and force the brake-shoe into contact with the tire of the wheel, thereby retarding the progress of the vehicle, and when it is desired to proceed by an almost imperceptible movement or shifting of the weight of his body the brake may be withdrawn from the wheel and the progress of the vehicle no longer retarded.

Having thus described my invention, what I claim as new, and desire to secure by Letters Patent of the United States of America, is—

1. In a vehicle-brake, the combination with the vehicle-frame, the seat-post having a transverse bearing in its upper end, a cylinder or pin journaled in said bearing, a saddle supported by said cylinder or pin and a brake-shoe operated by the movement of the saddle in said bearing, of a lock interposed directly between the cylinder or pin and the seat-post for locking them rigidly together; substantially as described.

2. In a bicycle-brake, the combination with the seat-post having a bearing in its upper end, the cylinder journaled in said bearing, the saddle carried by said cylinder, and the brake-shoe operated by the tilting of the saddle in said bearing, of a locking-pin journaled in the seat-post and coöperating with a recess in the cylinder to limit the movement of the latter and a projection on said pin and coöperating recess in the cylinder for locking the cylinder and saddle against independent movement; substantially as described.

JAMES JAMIESON.

Witnesses:
 JAMES J. CROW,
 KING BARTON.